(12) United States Patent
Fowler et al.

(10) Patent No.: US 7,491,152 B2
(45) Date of Patent: Feb. 17, 2009

(54) SYSTEM AND METHOD FOR CONTROLLING ENGAGEMENT OF A CLUTCH

(75) Inventors: Paul Martin Fowler, Cheshire (GB); Robert Stanley Wheeler, Redditch (GB); Jon A. Steeby, Schoolcraft, MI (US); Anthony Stasik, Lancashire (GB); Jeffrey P. Hawarden, Lancashire (GB)

(73) Assignee: Eaton Corporation, Cleveland, OH (US)

( * ) Notice: Subject to any disclaimer, the term of this patent is extended or adjusted under 35 U.S.C. 154(b) by 192 days.

(21) Appl. No.: 10/550,501

(22) PCT Filed: Mar. 23, 2004

(86) PCT No.: PCT/GB2004/001254

§ 371 (c)(1),
(2), (4) Date: Sep. 21, 2005

(87) PCT Pub. No.: WO2004/085868

PCT Pub. Date: Oct. 7, 2004

(65) Prior Publication Data

US 2006/0247094 A1 Nov. 2, 2006

(30) Foreign Application Priority Data

Mar. 25, 2003 (GB) .................... 0306762.6

(51) Int. Cl.
*B60W 10/02* (2006.01)
(52) U.S. Cl. ....................... 477/174; 477/180
(58) Field of Classification Search ................ 477/174, 477/179, 180
See application file for complete search history.

(56) References Cited

U.S. PATENT DOCUMENTS

| 4,081,065 A | * | 3/1978 | Smyth et al. ............... 477/176 |
| 5,072,815 A | * | 12/1991 | Jarvis ........................... 477/85 |
| 5,097,724 A | * | 3/1992 | Braun .......................... 477/73 |
| 5,383,823 A | * | 1/1995 | Ward et al. .................... 477/86 |

(Continued)

FOREIGN PATENT DOCUMENTS

DE 197 19 614 11/1997

(Continued)

OTHER PUBLICATIONS

International Search Report (3 pages).

(Continued)

*Primary Examiner*—Roger Pang
(74) *Attorney, Agent, or Firm*—Rader, Fishman & Grauer PLLC (57) ABSTRACT

A control system and method is provided for controlling engagement of a vehicle master clutch (16) in response to a throttle operating parameter. The method includes the steps of determining a throttle operating parameter value and setting an operating mode of the clutch based on the throttle operating parameter value. The method may include the steps of comparing the throttle operating parameter value to a threshold value and setting the operating mode of the clutch based on the comparison step. The control system includes a microprocessor for receiving signals corresponding to a throttle operating parameter value. The microprocessor sets an operating mode of the clutch based on the throttle operating parameter value or, optionally, the comparison of the throttle operating parameter value to a threshold value.

14 Claims, 5 Drawing Sheets

U.S. PATENT DOCUMENTS

| | | | |
|---|---|---|---|
| 5,403,250 A * | 4/1995 | Juergens | 477/176 |
| 5,766,110 A * | 6/1998 | Kanno et al. | 477/39 |
| 5,803,868 A * | 9/1998 | Kono et al. | 477/168 |
| 5,957,805 A | 9/1999 | Salecker et al. | |
| 5,980,428 A * | 11/1999 | Liu | 477/180 |
| 6,445,992 B2 * | 9/2002 | Wheeler et al. | 701/67 |
| 6,638,197 B2 | 10/2003 | Ogawa et al. | |
| 6,743,150 B2 * | 6/2004 | Takatori et al. | 477/176 |
| 6,850,829 B2 * | 2/2005 | Eich et al. | 701/67 |

FOREIGN PATENT DOCUMENTS

| | | |
|---|---|---|
| DE | 102 30 612 | 2/2003 |
| GB | 2 346 660 | 8/2000 |

OTHER PUBLICATIONS

Derwent English Abstract for DE 102 30 612 A1.
Derwent English Abstract for DE 197 19 614 A1.

* cited by examiner

SYSTEM AND METHOD FOR CONTROLLING ENGAGEMENT OF A CLUTCH

FIELD OF THE INVENTION

The present invention relates to clutch controls for automatically controlling the engagement and disengagement of transmission master clutches, and more particularly relates to clutch controls that control engagement of a transmission master clutch in response to throttle application.

BACKGROUND OF THE INVENTION

Automatic mechanical transmission systems and the automatic controls for the master clutches thereof are known in the prior art as may be seen by reference to U.S. Pat. Nos. 3,478,851; 3,752,284; 4,019,614; 4,038,889; 4,081,065 and 4,361,061, the disclosures of which are hereby incorporated by reference.

Briefly, in such automatic mechanical transmissions systems, various drive line operations, including, the supply of fuel to the engine, the engagement and disengagement of the master clutch, the shifting of the transmission and the operation of other devices, such as input or output shaft brakes, are automatically controlled by a control system based upon certain measured, sensed and/or calculated input parameters. Typically, the input parameters include engine speed, throttle position, transmission input and/or output shaft speed, vehicle speed, current engaged gear ratio, application of the brakes and the like. The term throttle position is utilized to signify the position or setting of any operator controlled device for controlling the supply of fuel to an engine.

Referring specifically to the automatic clutch control, in a vehicle equipped with an automatic mechanical transmission, during normal operation, when starting from rest or operating at a very low speed, the master friction clutch is modulated between fully disengaged and fully engaged conditions, i.e., is partially engaged, according to certain input parameters, to maintain the engine speed at a set value above idle speed and/or to achieve smooth starts. This method of engaging the master clutch generally provides a high quality and consistent engagement of the clutch under all types of throttle applications. However, a smooth and consistent engagement of the clutch is not necessarily desirable in all circumstances, particularly when the vehicle is starting out on a steep grade or when other aggressive performance is demanded by the driver or the control system.

SUMMARY OF THE INVENTION

In accordance with the present invention, a clutch control system and method for controlling engagement of a vehicle master clutch is provided that controls engagement of the master clutch in response to a throttle operating parameter. The method includes the steps of determining a throttle operating parameter value and setting an operating mode of the clutch based on the throttle operating parameter value. The method may also include the steps of comparing the throttle operating parameter value to a threshold value and setting the operating mode of the clutch based on the comparison step.

In another embodiment of the invention, the method includes the steps of determining at least one vehicle operating condition and comparing the vehicle operating condition to a predetermined limit. The operating mode of the clutch is then set based on the step of comparing the vehicle operating condition to the predetermined limit.

The control system includes a microprocessor for receiving signals corresponding to a throttle operating parameter value. The microprocessor sets an operating mode of the clutch based on the throttle operating parameter value or, optionally, the comparison of the throttle operating parameter value to a threshold value. In another embodiment of the invention, the microprocessor determines a vehicle operating condition and compares the vehicle operating condition to a predetermined limit. The microprocessor sets the operating mode of the clutch based on the comparison of the vehicle operating condition to the predetermined limit.

Various additional aspects of this invention will become apparent to those skilled in the art from the following detailed description of the preferred embodiment, when read in light of the accompanying drawings.

DETAILED DESCRIPTION OF PREFERRED EMBODIMENTS

Figure 1:
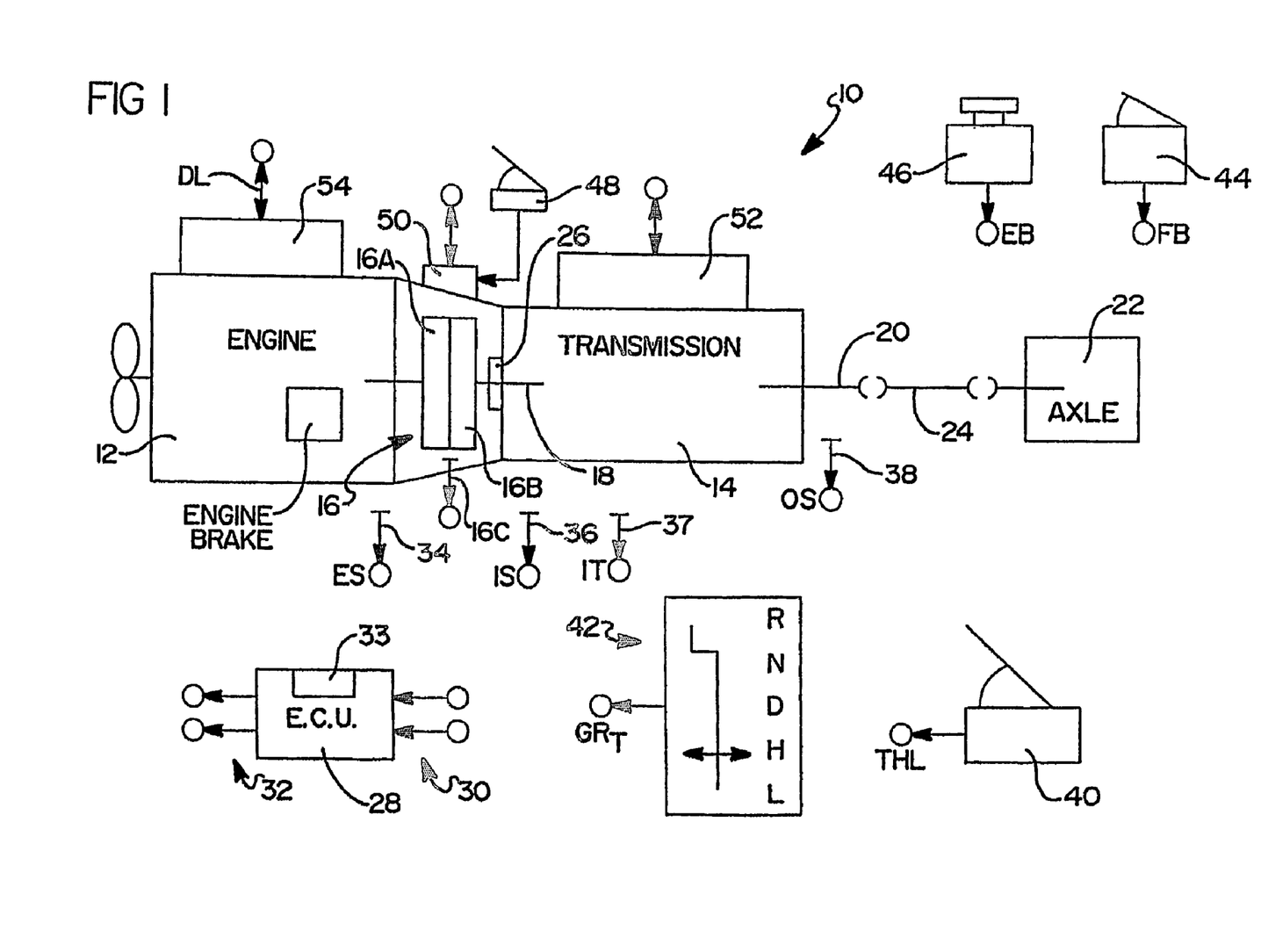
FIG. 1 is a schematic illustration, in block diagram format, of an automated mechanical transmission system utilizing the control system and method of the present invention.

Referring now to the drawings, there is schematically illustrated in FIG. 1 an at least partially automated mechanical transmission system 10 intended for vehicular use. The automated transmission system 10 includes a fuel-controlled engine 12 (such as a diesel engine and the like), a multiple-speed, change-gear transmission 14, and a master clutch 16 (such as a friction master clutch) drivingly interposed between the engine and the input shaft 18 of the transmission. Transmission 14 may be of the compound type comprising a main transmission section connected in series with a splitter- and/or range-type auxiliary section. Transmissions of this type, especially those used with heavy-duty vehicles, typically have multiple forward speeds. Examples of such transmissions may be seen by reference to U.S. Pat. Nos. 5,390,561 and 5,737,978, the disclosures of which are incorporated herein by reference. A transmission output shaft 20 extends outwardly from transmission 14 and is drivingly connected with the vehicle drive axles 22, usually by means of a prop shaft 24.

Master clutch 16 includes a driving portion 16A connected to the engine crankshaft/flywheel and a driven portion 16B coupled to transmission input shaft 18 and adapted to frictionally engage driving portion 16A. See U.S. Pat. Nos. 5,634,541, 5,450,934 and 5,908,100, which are incorporated by reference. An upshift brake 26 (also known as an input shaft brake or inertia brake) may be used for selectively decelerating the rotational speed of the input shaft 18 for more rapid upshifting, as is well known.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986, which is incorporated by reference.

System 10 includes a rotational speed sensor 34 for sensing rotational speed of the engine and providing an output signal (ES) indicative thereof, a rotational speed sensor 36 for sensing the rotational speed of the input shaft 18 and providing an output signal (IS) indicative thereof, a torque sensor 37 for sensing the torque of the input shaft 18 and providing an output signal (IT), and a rotational speed sensor 38 for sensing the rotational speed of the output shaft 20 and providing an output signal (OS) indicative thereof A sensor 40 is also provided for sensing a throttle pedal operating parameter and providing an output signal (THL) indicative thereof. A shift control console 42 may be provided for allowing the operator to select an operating mode of the transmission system and for providing an output signal ($GR_T$) indicative thereof. System 10 also may include sensors 44 and 46 for sensing operation of the vehicle foot brake (also called service brake) and engine brakes, respectively, and for providing signals FB and EB, respectively, indicative thereof.

Master clutch 16 is controlled by a clutch actuator 50 (Autoclutch) responding to command output signals 32 from ECU 28. Alternatively, an actuator responsive to control output signals may be provided, which may be overridden by manual operation of a clutch pedal 48. The engaged and disengaged (i.e., "not engaged") condition of clutch 16 may be sensed by a position sensor 16C or may be determined by comparing the speeds of the engine (ES) and the input shaft (IS).

Transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391, which are incorporated by reference. Actuator 52 may shift the main and/or auxiliary section of transmission 14.

Fueling of the engine is preferably controlled by an electronic engine controller 54, which accepts command signals from and/or provides input signals to the ECU 28. Preferably, engine controller 54 will communicate with an industry standard data link DL which conforms to well-known industry protocols such as SAE J1922, SAE J1939 and/or ISO 11898. ECU 28 may be incorporated within engine controller 54.

Additionally, ECU 28 is electrically coupled to throttle sensor 40 to receive one or more output signals THL. Output signal THL corresponds to one or more throttle operating parameters, including, but not limited to, throttle position, throttle application rate, and acceleration of throttle application. For the sake of illustration, the following method of controlling engagement of clutch 16 will be described in response to the throttle application rate. It will be appreciated that the invention is not limited by the ECU 28 receiving signals from throttle sensor 40, and that the invention can be practiced by the ECU 28 receiving signals from any component that is capable of detecting the desired fueling rate of engine 12, such as engine controller 54.

Figure 2:
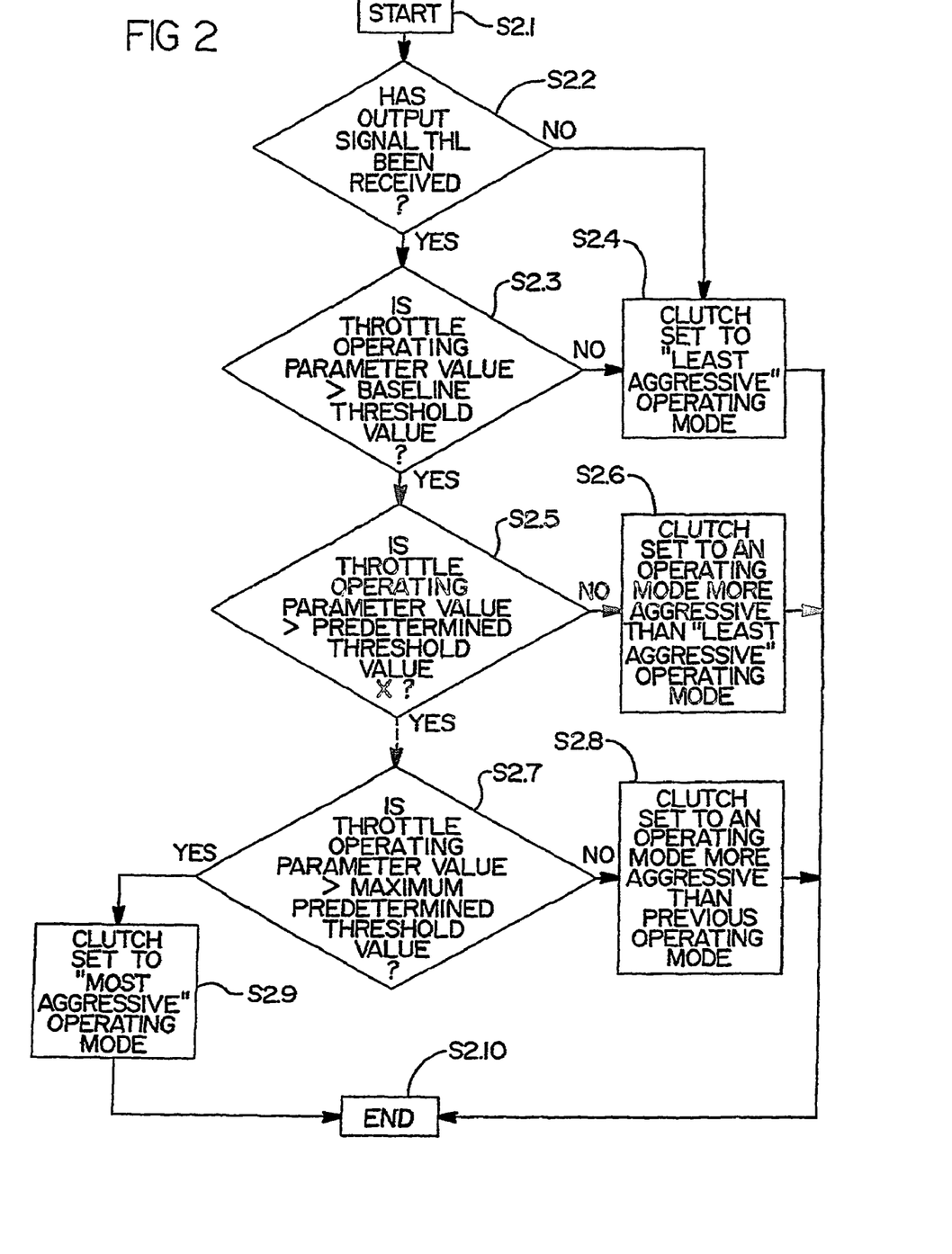
FIG. 2 is a schematic illustration in flow chart format of a clutch control method according to one embodiment of the present invention.

Referring now to FIG. 2, there is illustrated in flow chart format a method for controlling the engagement of clutch 16 based on output signal THL from throttle sensor 40. Initially, the method of the invention begins at step (S2.1). Then, ECU 28 receives an output signal THL from throttle sensor 40 (S2.2) corresponding to a throttle operating parameter value, e.g., the throttle application rate, and determines if the subject throttle operating parameter value is greater than a baseline threshold value programmed into ECU 28 (S2.3). This threshold value corresponds to the "least aggressive" clutch operating mode, which in the present embodiment, results in the highest quality clutch engagement rate. The highest quality clutch engagement rate is typically employed in conventional automated mechanical transmission systems to smoothly launch a vehicle. When the subject throttle operating parameter value is less than or substantially equal to the baseline threshold value, or in the absence of an output signal THL, ECU 28 will set clutch engagement to the least aggressive operating mode and engage clutch 16 according to the highest quality engagement rate (S2.4).

If, however, the subject throttle operating parameter is greater than the baseline threshold value, then ECU 28 determines if the subject throttle operating parameter is greater than a predetermined threshold value X (S2.5). If the subject throttle operating parameter value is less than the predetermined threshold value X, but greater than the baseline threshold value, ECU 28 will engage clutch 16 according to a predetermined operating mode that is more aggressive than the least aggressive operating mode described above (S2.6).

This process of comparing the subject throttle operating parameter value to a threshold value and setting the operating mode of the clutch according to the comparison step is repeated a predetermined number of times until the throttle operating parameter value is compared to a maximum predetermined threshold value (S2.7). If the subject throttle operating parameter value is less than the maximum predetermined threshold value, but greater than the previously compared threshold value, ECU 28 will engage clutch 16 according to a predetermined operating mode that is more aggressive than the previous operating mode (S2.8). If, however, the subject throttle operating parameter is greater than the maximum threshold value, then ECU 28 will set clutch 16 to the most aggressive operating mode, which, in the present embodiment, results in clutch 16 being engaged according to the most aggressive engagement rate (S2.9). The control method ends at step (S2.10).

Figure 3:
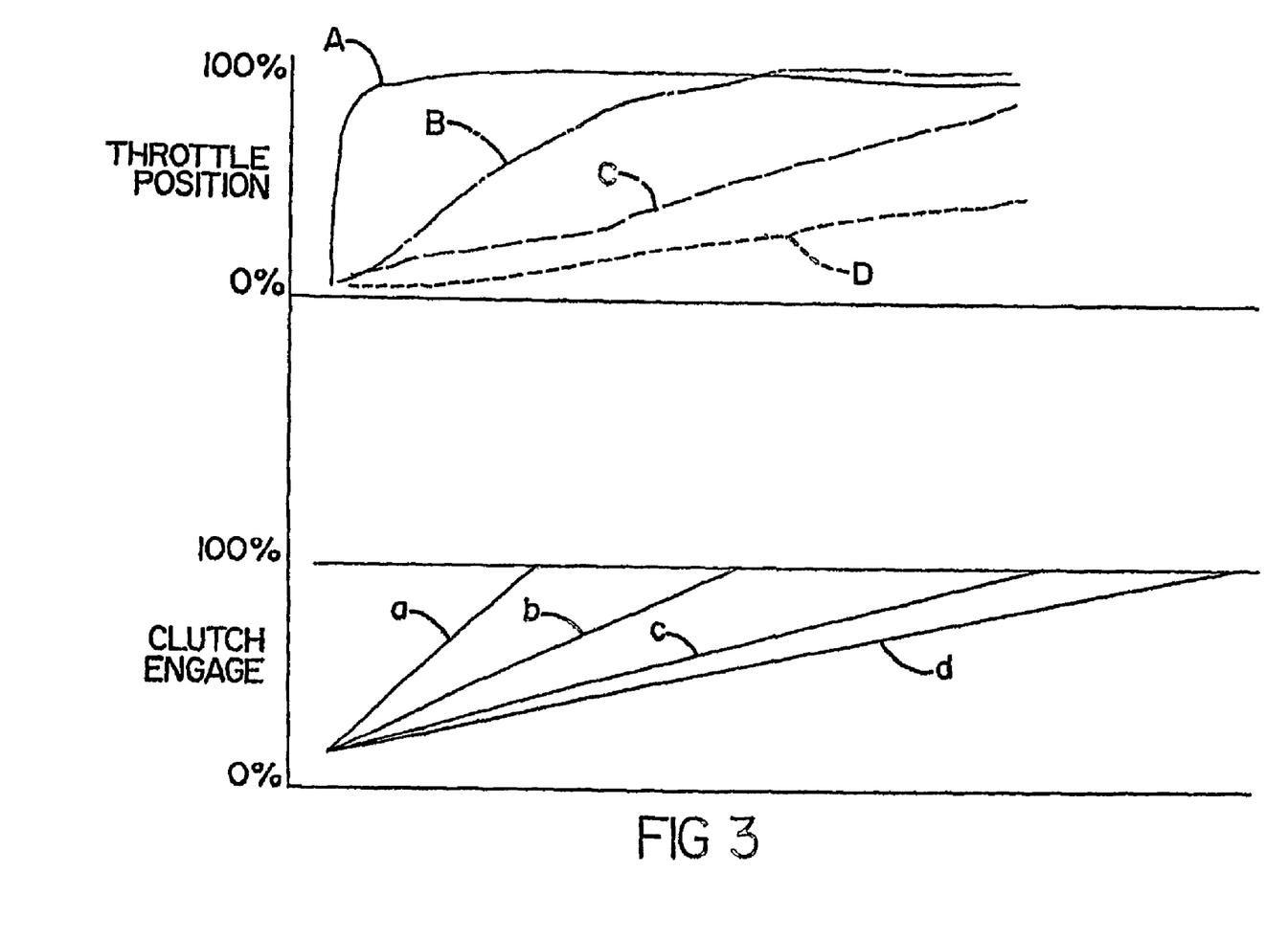
FIG. 3 is a schematic illustration, in graphical format, illustrating exemplary throttle application rates and corresponding clutch engagement rates according to the control method illustrated in FIG. 2.

Referring to FIG. 3, the method of engaging clutch 16 according to the embodiment of the invention illustrated in FIG. 2 is depicted graphically. The top portion of FIG. 3 graphically illustrates four exemplary throttle application rates (A, B, C and D). The bottom portion of FIG. 3 graphically illustrates four exemplary clutch engagement rates (a, b, c and d). A light application of the throttle is denoted by line D; whereas, a heavy application of the throttle is denoted by line A. For purposes of illustration, the light application of the throttle results in ECU 28 setting clutch 16 to the least aggressive operating mode, which corresponds to the least aggressive clutch engagement rate (line d). In contrast, heavy application of the throttle results in ECU 28 setting clutch 16 to the most aggressive operating mode, which corresponds to the most aggressive clutch engagement rate (line a).

Figure 4:
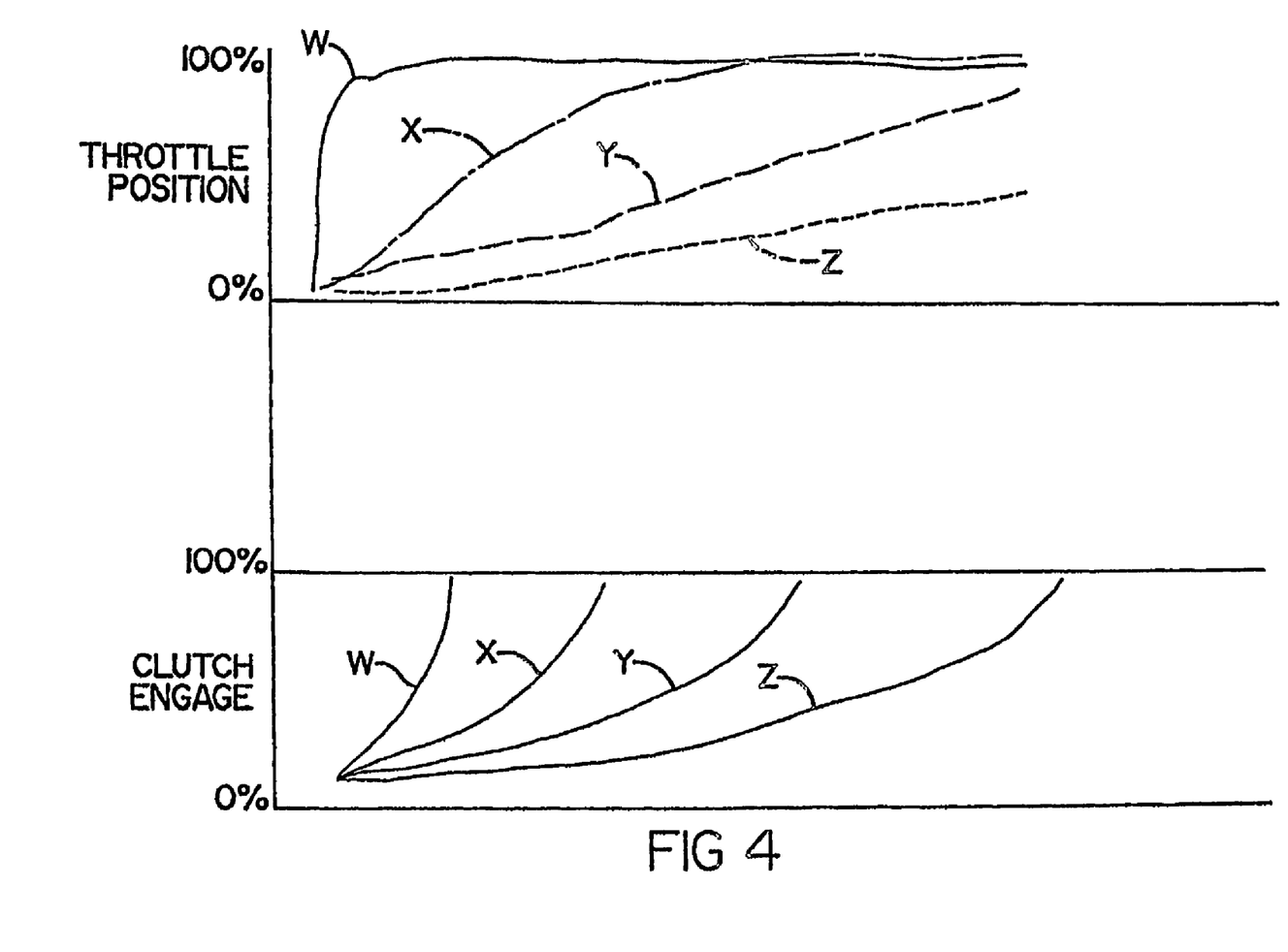
FIG. 4 is a schematic illustration, in graphical format, illustrating exemplary throttle application rates and corresponding clutch engagement rates according to an alternate embodiment of the present invention.

Referring to FIG. 4, an alternate embodiment of the control method is described. In this embodiment, the clutch operating mode is determined as a direct function of the subject throttle operating parameter value as the throttle pedal is depressed. Stated differently, the subject throttle operating parameter value is not compared to a threshold value as described above; rather, the clutch operating mode is a direct functional correlation of the instantaneous value of the subject throttle operating parameter value. This results in an infinite number of clutch operating modes, which is in contrast to the finite number of clutch operating modes described above and shown in FIG. 3. For example, the top portion of FIG. 4 plots four exemplary throttle application rates (W, X, Y and Z). The bottom portion of FIG. 4 plots four exemplary clutch engagement rates (w, x, y and z), which are a direct functional correlation of each of curves W, X, Y and Z, respectively.

Figure 5:
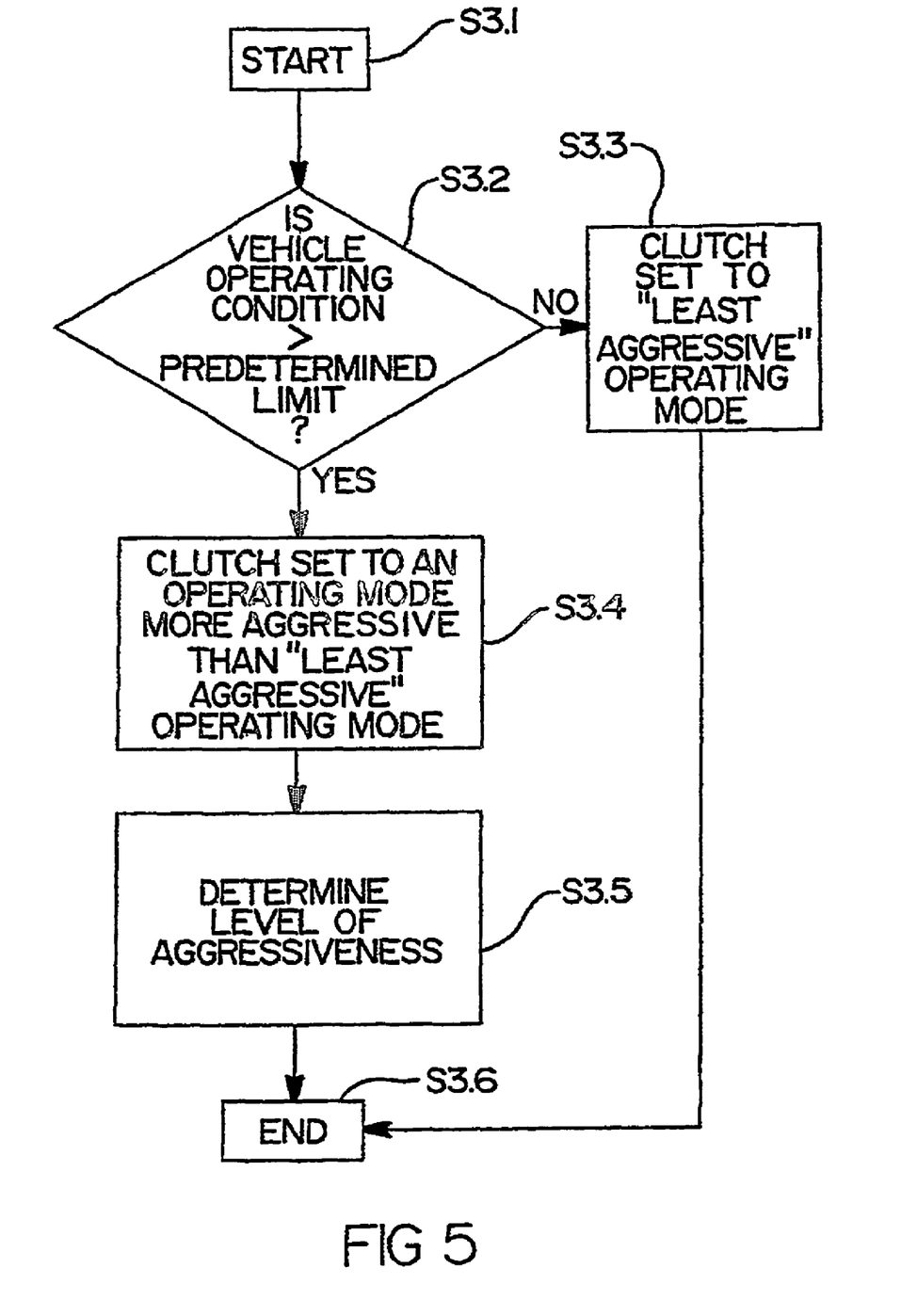
FIG. 5 is a schematic illustration in flow chart format of a clutch control method according to another embodiment of the present invention.

Another embodiment of the present invention is shown in FIG. 5. In this embodiment, the clutch engagement rate is modified only when ECU 28 determines the need for a more aggressive engagement of clutch 16. Under certain vehicle operating conditions it may be desirable to aggressively engage clutch 16, such as when the vehicle is starting on a relatively steep grade or carrying a relatively large load, to prevent excessive wear or damage to clutch 16. In this embodiment, the method of the invention begins at Step (S3.1). Then, ECU 28 will determine if a vehicle operating condition exceeds a predetermined limit or threshold (S3.2). For example, a vehicle operating condition may be the relative inclination of the vehicle when parked on a hill and the predetermined limit maybe a 10° inclination. If the subject vehicle operating condition is less than or substantially equal to the predetermined limit, then ECU 28 will set clutch engagement to the least aggressive operating mode described above (S3.3).

If, however, the predetermined limit is exceeded, then ECU 28 will set clutch engagement to a more aggressive operating mode (S3.4). The more aggressive operating mode may cause ECU 28 to engage clutch 16 at a faster rate than the rate of clutch engagement prior to the more aggressive operating mode, thereby minimizing the amount of time the clutch slips and resulting heat buildup in clutch 16. The aggressiveness of the operating mode can be determined by comparing the subject throttle operating parameter value to a predetermined number of specified threshold values, or by functionally correlating the instantaneous clutch engagement rate with the value of the subject throttle operating parameter value (S3.5), both of these concepts having been defined above. The control method ends at step (S3.6).

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A vehicle master clutch engagement method, comprising the steps of:
   determining a throttle operating parameter value;
   comparing the throttle operating parameter value to a first threshold value; and
      setting an operating mode of the clutch based on the comparison step at a first rate when the throttle operating parameter value is less than the first threshold value; and at a second rate more aggressive than the first rate when the throttle operating parameter value is greater than the first threshold value.

2. The method of claim 1, wherein the throttle operating parameter value corresponds to throttle position.

3. The method of claim 1 wherein the operating mode further comprises engaging the clutch at the first rate when the throttle operating parameter value is substantially equal to the first threshold value.

4. The method of claim 1, wherein the operating mode comprises engaging the clutch at the first rate when no throttle operating parameter value is determined.

5. A vehicle master clutch engagement method, comprising the steps of:
   determining a throttle operating parameter value; and
   setting an operating mode of the clutch based on the throttle operating parameter value, wherein the operating mode further comprises engaging the clutch at a first rate when the throttle operating parameter value is less than the first threshold value and at a more aggressive rate than the first rate when the throttle operating parameter value is greater than the first threshold value.

6. The method of claim 5 further comprising the step of setting an operating mode to engage the clutch at a third rate when the throttle operating parameter value is greater than the second threshold value.

7. The method of claim 5 wherein the step of determining a throttle operating parameter value comprises sensing at least one throttle operating parameter with a sensor and providing a signal corresponding to a throttle operating parameter value to a controller.

8. A control system for engaging a vehicle master clutch, said system comprising a controller; and at least one sensor for sensing at least one throttle operating parameter and providing an output signal to said controller indicative thereof, wherein:
   the controller determines a throttle operating parameter value based on the received output signal, compares the throttle operating parameter value to a first threshold value, and sets an operating mode of the vehicle master clutch based on the comparison between the throttle operating parameter value and the first threshold value; and
   the operating mode comprises engaging the clutch at a first rate when the throttle operating parameter value is less than a first threshold value and engaging the clutch at a second rate more aggressive than the first rate when the throttle operating parameter value is greater than the first threshold value.

9. The system of claim 8, wherein the throttle operating parameter value corresponds throttle position.

10. The system of claim 8, wherein the throttle operating mode comprises engaging the clutch at the first rate when the throttle operating parameter value is substantially equal to a first threshold value.

11. The system of claim 8, wherein the operating mode comprises engaging the clutch at first rate when no throttle operating parameter value is determined.

12. The method of claim 8 wherein the operating mode further comprises engaging the clutch at a third rate more aggressive than the second rate when the throttle operating parameter value is greater than a second threshold value.

13. A control system for engaging a vehicular master clutch that comprises an electronic control unit for receiving signals corresponding to a throttle operating parameter value, the electronic control unit setting an operating mode of the clutch based on the throttle operating parameter value, wherein the operating mode comprises engaging the clutch at a first rate when the throttle operating parameter value is less than a first threshold value and engaging the clutch at a second rate more aggressive than the first rate when the throttle operating parameter value is greater than the first threshold value.

14. A vehicle master clutch engagement method for use with a vehicle that includes a fuel controlled engine, a master clutch and a transmission, the method comprising the steps of:

determining a desired fueling rate of the engine; and setting an engagement rate of the clutch based on the desired fueling rate of the engine, wherein the engagement rate of the clutch is set at a first rate when the desired fueling rate of the engine is less than a first threshold value and is set at a second rate more aggressive than the first rate when the desired fueling rate of the engine is greater than the first threshold value.

* * * * *